(12) United States Patent
Soni et al.

(10) Patent No.: US 11,075,871 B2
(45) Date of Patent: Jul. 27, 2021

(54) TASK ASSIGNMENT FROM A FILE THROUGH A CONTEXTUAL ACTION

(71) Applicant: Microsoft Technology Licensing, LLC, Redmond, WA (US)

(72) Inventors: Shahil Soni, Seattle, WA (US); Philip Zhian Loh, Seattle, WA (US); Alexander Darrow, Seattle, WA (US); Joseph Masterson, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 308 days.

(21) Appl. No.: 15/264,803

(22) Filed: Sep. 14, 2016

(65) Prior Publication Data
US 2018/0077103 A1 Mar. 15, 2018

(51) Int. Cl.
*G06F 15/16* (2006.01)
*H04L 12/58* (2006.01)
*H04L 29/08* (2006.01)
*G06Q 10/10* (2012.01)

(52) U.S. Cl.
CPC .......... *H04L 51/22* (2013.01); *G06Q 10/101* (2013.01); *H04L 67/10* (2013.01); *H04L 67/32* (2013.01)

(58) Field of Classification Search
CPC .... G06F 3/0488; G06F 9/4856; G06F 9/4881; G06F 17/2288; G06F 15/163; G06F 40/129; G06Q 10/10; G06Q 10/103; G06Q 10/107; G06Q 30/0482; G06Q 30/0484; G06Q 10/101; G06Q 10/063114; G06Q 40/02; H04L 12/185; H04L 51/04; H04L 51/22
See application file for complete search history.

(56) References Cited

U.S. PATENT DOCUMENTS

| | | | |
|---|---|---|---|
| 7,139,800 B2 * | 11/2006 | Bellotti | G06Q 10/107 709/206 |
| 8,032,553 B2 | 10/2011 | Lippe et al. | |
| 8,082,308 B1 * | 12/2011 | Filev | G06Q 10/103 707/608 |
| 8,639,552 B1 * | 1/2014 | Chen | G06F 9/4881 705/7.21 |
| 8,949,275 B1 | 2/2015 | Aasuri-Maringanti | |
| 9,098,834 B2 | 8/2015 | Ramanathaiah et al. | |
| 9,350,775 B2 | 5/2016 | Edelstein et al. | |
| 9,774,561 B1 * | 9/2017 | Rapp | H04L 12/185 |
| 2003/0233419 A1 * | 12/2003 | Beringer | G06Q 10/107 709/206 |

(Continued)

OTHER PUBLICATIONS

"International Search Report and Written Opinion Issued in PCT Application No. PCT/US2017/050872", dated Nov. 8, 2017, 11 Pages.

(Continued)

*Primary Examiner* — Dustin Nguyen

(57) ABSTRACT

Aspects of the present disclosure relate to systems and methods for assigning tasks to collaborators of a file through a contextual action. In one aspect, rendering of a file within an email application including a reading pane may be initiated. A task object may be created based on an input made with respect to the file. A reference point associated with the task object may be created within the file. The task object may be assigned to at least one collaborator of the file via the email application.

20 Claims, 9 Drawing Sheets

(56) References Cited

U.S. PATENT DOCUMENTS

| | | | |
|---|---|---|---|
| 2004/0141004 A1* | 7/2004 | Cabezas | G06Q 10/107 715/751 |
| 2006/0010025 A1 | 1/2006 | Sattler et al. | |
| 2006/0069990 A1* | 3/2006 | Yozell-Epstein | G06Q 10/107 715/273 |
| 2006/0259524 A1* | 11/2006 | Horton | G06F 17/2288 |
| 2007/0282660 A1 | 12/2007 | Forth | |
| 2008/0209417 A1* | 8/2008 | Jakobson | G06F 9/4856 718/100 |
| 2008/0301296 A1 | 12/2008 | York | |
| 2009/0049131 A1* | 2/2009 | Lyle | H04L 51/04 709/206 |
| 2009/0138558 A1 | 5/2009 | Benoit et al. | |
| 2009/0216792 A1* | 8/2009 | Grebner | G06Q 10/103 |
| 2009/0216843 A1* | 8/2009 | Willner | G06Q 10/107 709/206 |
| 2009/0307605 A1* | 12/2009 | Ryan | G06Q 10/10 715/751 |
| 2010/0138212 A1* | 6/2010 | Wang | G06F 40/129 704/3 |
| 2012/0005578 A1* | 1/2012 | Hawkins | G06F 3/0488 715/702 |
| 2012/0151377 A1* | 6/2012 | Schultz | G06Q 10/103 715/751 |
| 2012/0278388 A1* | 11/2012 | Kleinbart | G06Q 10/10 709/204 |
| 2013/0179799 A1* | 7/2013 | Savage | G06F 3/0482 715/751 |
| 2014/0006972 A1 | 1/2014 | Celkonas | |
| 2014/0101780 A1* | 4/2014 | Zuber | G06Q 40/02 726/28 |
| 2014/0281870 A1 | 9/2014 | Vogel et al. | |
| 2014/0310345 A1* | 10/2014 | Megiddo | G06F 15/163 709/204 |
| 2015/0082196 A1* | 3/2015 | Berger | G06Q 10/101 715/753 |
| 2015/0143258 A1* | 5/2015 | Carolan | G06F 3/0484 715/752 |
| 2015/0193492 A1 | 7/2015 | Gunaratne et al. | |
| 2016/0269337 A1* | 9/2016 | Blinder | H04L 51/22 |
| 2017/0103359 A1* | 4/2017 | Teevan | G06Q 10/063114 |

OTHER PUBLICATIONS

"Add, View and Delete Tasks", Published on: Nov. 13, 2012. Available at: https://www.zoho.com/docs/help/add-view-delete-task.html.

Olivia, "Notify Task Sender when task is completed", Retrieved on: Jun. 20, 2016 Available at: https://success.salesforce.com/ideaView?id=08730000000BrCe.

Parthasarthy, Adarsh, "Send email notification for "Completed" Tasks to Task Creator", Retrieved on: Jun. 20, 2016 Available at: https://success.salesforce.com/ideaView?id=08730000000BqzD.

* cited by examiner

FIG. 2B

TASK ASSIGNMENT FROM A FILE THROUGH A CONTEXTUAL ACTION

BACKGROUND

Computer and software users have grown accustomed to user-friendly software applications for co-authoring files, documents, messages, and the like. For example, storage providers (e.g., cloud storage providers) provide applications such as word processing applications, spreadsheet applications, electronic slide presentation applications, email applications, chat applications, voice applications, and the like, where users can co-author and collaborate with one another within the applications. Collaboration includes creating tasks for co-collaborators to complete. Current techniques for creating tasks for co-collaborators to complete include writing comments, copying and pasting text from a document into an email application, for example, and/or creating a task item using an email application. As such, creating tasks for co-collaborators to complete in a document may be cumbersome, difficult, and inefficient, ultimately resulting in a lack of participating in document collaboration and/or tasks being incomplete.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In summary, the disclosure generally relates to systems and methods for assigning tasks to collaborators of a file through a contextual action. In one aspect, rendering of a file within an email application including a reading pane may be initiated. A task object may be created based on an input made with respect to the file. A reference point associated with the task object may be created within the file. The task object may be assigned to at least one collaborator of the file via the email application.

In another aspect, rendering of a file in a user interface may be initiated. In response to an input made with respect to the file, a contextual menu associated with the file may be displayed. The contextual menu may include at least one contextual action. In response to receiving a selection of the at least one contextual action, a task object and a reference point within the file may be created, where the reference point is associated with the task object. The task object may be assigned to at least one collaborator of the file.

In yet another aspect, an email application comprises a file in a user interface for collaborating among a plurality of collaborators of the file. The email application may further comprise a task object in a reading pane through which to receive an indication of interest made with respect to the task object. The email application may further comprise a reference point within the file through which to, in response to the indication of interest made with respect to the task object, display a portion of the file including the reference point.

DESCRIPTION OF THE DRAWINGS

The detailed description is made with reference to the accompanying figures. In the figures, the left-most digit(s) of a reference number identifies the figure in which the reference number first appears. The use of the same reference numbers in different instances in the description and the figures may indicate similar or identical items.

FIG. 2B illustrates another view in a progression of views of the email application of FIG. 2A, according to an example aspect.

DETAILED DESCRIPTION

Figure 1:
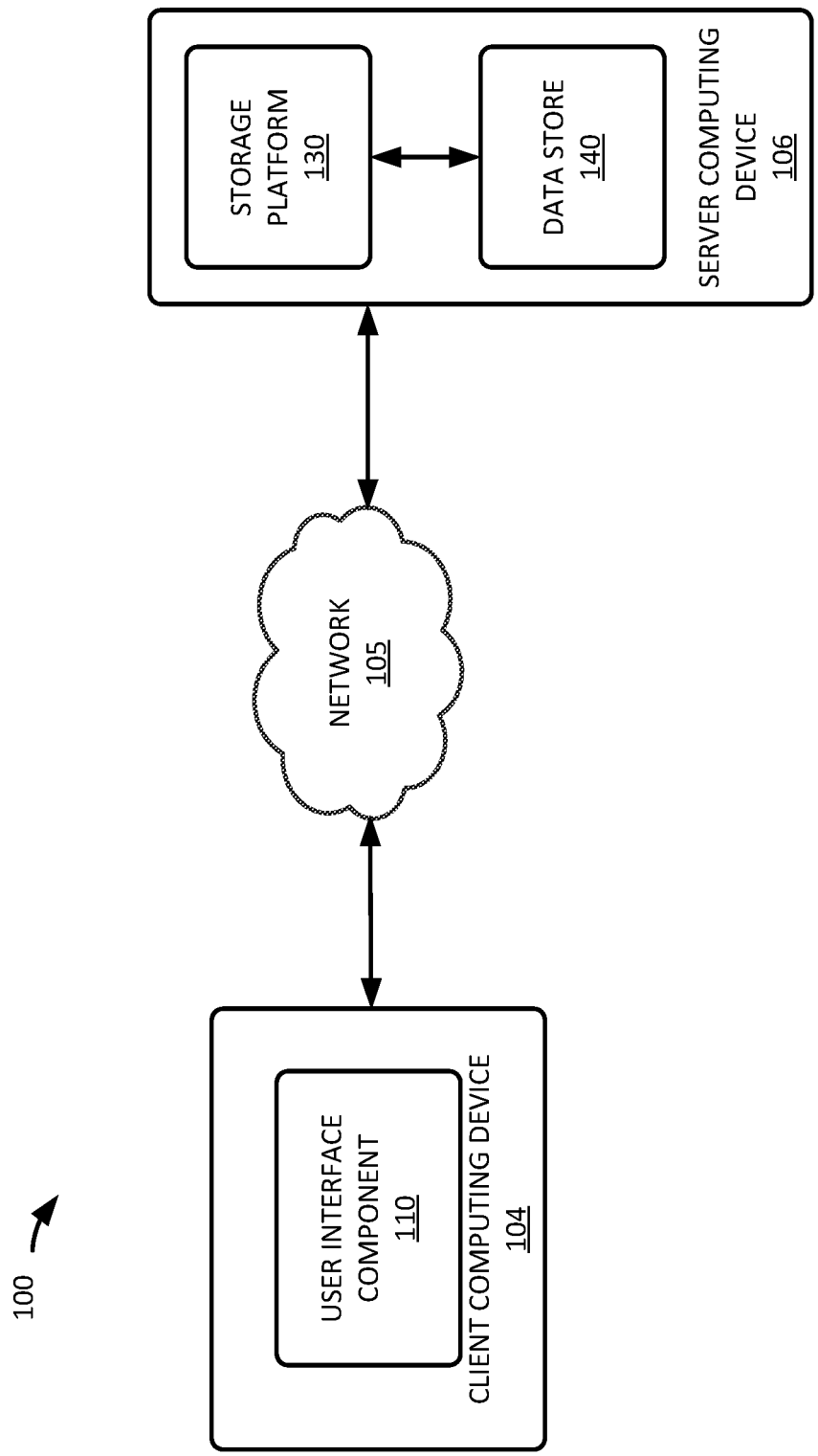
FIG. 1 illustrates an exemplary file collaboration system for assigning tasks to collaborators of a file through a contextual action, according to an example aspect.

Aspects of the disclosure are generally directed to assigning tasks to collaborators of a file through a contextual action. For example, a file such as a word processing file created by a collaboration application may be displayed within an email application when opened from an attachment in an email, for example. In some cases, the file may be displayed side by side with the reading pane of the email application such that a collaborator can view both the file and the email message at the same time. When one collaborator wants to assign a task related to the file to another collaborator and/or multiple collaborators of the file, the collaborator may do so through a contextual action. For example, the collaborator assigning a task may highlight a portion of content of the file and/or perform a right click on a portion of content of the file to view a contextual menu. The contextual menu may include a contextual action such as assign task. When the collaborator selects the assign task contextual action, a task object may be created. The task object may include one or more parameters for the collaborator to set such as a task description, deadline, reminder, priority, and the like. When the task object is created, a reference point may be created within the file where the collaborator assigned the task. For example, the reference point may include the highlighted portion if the collaborator highlighted a portion of the content to view the contextual menu including the assign task contextual action. The task object may be assigned to another collaborator via the email application using at least one of an email message, a notification, and a task list.

As discussed above, current techniques for creating tasks for co-collaborators to complete include writing comments, copying and pasting text from a document into an email application, for example, and/or creating a task item using an email application. As such, creating tasks for co-collaborators to complete in a document may be cumbersome, difficult, and inefficient, ultimately resulting in a lack of participating in document collaboration and/or tasks being incomplete.

Accordingly, aspects described herein include techniques that make assigning tasks to collaborators of a file intuitive, user-friendly, and efficient. In one aspect, rendering of a file in an email application may be initiated. The email application may include a reading pane comprising content of an email message. In some examples, the file and the reading pane may be displayed side by side within the email application. In one example, displaying the file and the reading pane side by side within the email application may include displaying the file and the reading pane such that at least some portions of the file and the reading pane are overlapping in the display. In another example, displaying the file and the reading pane side by side within the email application may include displaying the file and the reading pane such that the file and the reading pane are not overlapping in the display. In this regard, a collaborator of the file may view both the file and the content of an email message at the same time. A collaborator of the file may assign a task to any other collaborator of the file (e.g., a task assigned to a specific collaborator or to one or more of the collaborators) through a simple contextual action. For example, a task object may be created based on an input made by a collaborator with respect to the file. For example, the input may include highlighting a portion of the content within the file. In another example, the input may include receiving a selection of a contextual action from within a contextual menu associated with the file. In one example, the contextual menu may be displayed within the file in response to a portion of the content being highlighted. In another example, the contextual menu may be displayed within the file in response to receiving an input within the file (e.g., a click from a mouse and/or a touch screen input).

In one example, when the task object is created, a reference point may be created within the file. The reference point may be associated with the task object. For example, the reference point within the file may include the point within the file where the input is received to create the task object. In some examples, when the task object is created, the task object may be assigned to at least one collaborator of the file via the email application. The task object may be assigned to another collaborator via the email application using at least one of an email message, a notification, and a task list. For example, when the other collaborator(s) is/are assigned a task, the task object may appear in the other collaborator(s) email inbox (e.g., in an email message), as an item in the other collaborators(s) task to-do list, and/or as a notification to other collaborator(s). In this regard, when the other collaborator(s) select(s) the task object from an email message, the task to-do list, and/or notification, the portion of the file including the reference point (e.g., the highlighted portion of the file) may be opened and displayed to the other collaborator(s). In turn, a user and/or collaborator of the file may quickly, intuitively, and efficiently assign a task to another collaborator, receive and identify a task to be completed, and easily complete the task while collaborating within applications.

As such, a technical effect that may be appreciated is that task objects are assigned to at least one collaborator of the file via the email application using at least one of an email message, a notification, and a task list in a clear and understandable manner and on a functional surface. In turn, collaboration on documents may be accomplished in a faster and/or more efficient manner, ultimately reducing processor load, conserving memory, and reducing network bandwidth usage. Another technical effect that may be appreciated is that users and/or co-authors/collaborators of a file may quickly, easily, and efficiently create, assign, view, and complete tasks and/or task objects while collaborating within applications. Yet another technical effect that may be appreciated is that displaying a contextual action within a contextual menu within the file and displaying a portion of content within the file including a reference point associated with the task object facilitates a compelling visual and functional experience to allow a user to efficiently interact with a user interface for collaborating and/or co-authoring within applications.

Referring now to the drawings, in which like numerals represent like elements through the several figures, aspects of the present disclosure and the exemplary operating environment will be described. With reference to FIG. 1, one aspect of file collaboration system 100 for assigning tasks to collaborators of a file through a contextual action is illustrated. The file collaboration system 100 may include a client computing device 104 and a server computing device 106. In aspects, the file collaboration system 100 may be implemented on the client computing device 104. In a basic configuration, the client computing device 104 is a handheld computer having both input elements and output elements. The client computing device 104 may be any suitable computing device for implementing the file collaboration system 100 for assigning tasks to collaborators of a file through a contextual action. For example, the client computing device 104 may be at least one of: a mobile telephone; a smart phone; a tablet; a phablet; a smart watch; a wearable computer; a personal computer; a desktop computer; a laptop computer; a gaming device/computer (e.g., Xbox); a television; and etc. This list is exemplary only and should not be considered as limiting. Any suitable client computing device 104 for implementing the file collaboration system 100 for assigning tasks to collaborators of a file through a contextual action may be utilized.

In aspects, the file collaboration system 100 may be implemented on the server computing device 106. The server computing device 106 may provide data to and from the client computing device 104 through a network 105. In aspects, the file collaboration system 100 may be implemented on more than one server computing device 106, such as a plurality of server computing devices 106. As discussed above, the server computing device 106 may provide data to and from the client computing device 104 through the network 105. The data may be communicated over any network suitable to transmit data. In some aspects, the network is a distributed computer network such as the Internet. In this regard, the network may include a Local Area Network (LAN), a Wide Area Network (WAN), the Internet, wireless and wired transmission mediums.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval, and various processing functions may be operated remotely from each other over a distributed computing network, such as the Internet or an Intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As discussed above, the file collaboration system 100 may include the client computing device 104 and the server computing device 106. The various components may be implemented using hardware, software, or a combination of hardware and software. In aspects, the client computing device 104 may include a user interface component 110. The user interface component 110 may facilitate assigning tasks to collaborators of a file through a contextual action. For example, the user interface component 110 may initiate rendering of a file created with a collaboration application in a user interface of the client computing device 104. In one example, a collaboration application may include any application suitable for collaboration and/or co-authoring such as a word processing application, spreadsheet application, electronic slide presentation application, email application, chat application, voice application, and the like. In one case, a file associated with and/or created with the application may include a word document, a spreadsheet, an electronic slide presentation, an email, a chat conversation, and the like. As such, an exemplary application may be an electronic slide presentation application. In this example, an exemplary file associated with the electronic slide presentation application may include an electronic slide presentation.

In another example, the user interface component 110 may initiate rendering of a file within an email application in a user interface of the client computing device 104. An email application may be any application or collection of applications, module or collection of modules, service or services, or any variation or combination thereof capable of facilitating sharing of content, communication, collaboration, conversations, and the like. Examples of an email application include Microsoft Outlook®, Outlook Web App®, Mobile Outlook®, Hotmail®, Outlook.com, as well as any other email application. In one example, the email application may include a reading pane. The reading pane may include contents associated with an email message. In one example, the file and the reading pane may be displayed side by side within the email application. For example, initiating rendering of the file within the email application may include displaying the file adjacent to the reading pane. In this regard, a collaborator may view both the file and the reading pane (e.g., the content associated with an email message) at the same time.

In one aspect, the user interface component 110, the file rendered on the user interface, and/or the email application may create a task object based on an input made with respect to the file. In one example, the input made with respect to the file includes highlighting content within the file. In another example, the input made with respect to the file includes receiving a selection of a contextual action within a contextual menu associated with the file. For example, a contextual menu associated with the file may include one or more contextual actions that may be performed in relation to the file. For example, the one or more contextual actions may include actions such as copy, paste, font, comment, etc. In one example, the contextual action includes an assign task action. In this example, the task object may be created in response to receiving a selection of the assign task action within the contextual menu. In other examples, the contextual action may include a create task action, task assignment action, or any other contextual action for creating and/or assigning a task and/or a task object associated with the file. In some examples, in response to detecting highlighting of content within the file, the contextual menu including at least one contextual action may be displayed within the file.

In aspects, the task object is an action to be completed by a collaborator of the file. The action may include any action and/or task associated with the file and/or the collaboration application associated with the file. For example, the task object may include an action such as editing, reviewing, adding content, formatting, sharing, commenting, and the like. In some examples, the task object includes one or more parameters associated with the task object. For example, the one or more parameters associated with the task object may include at least a task description, a task deadline, a task reminder, and a task priority level. The task description may describe the task and/or action to be completed. For example, the task description may indicate that a portion of the file needs to be edited. In one example, the collaborator creating the task may enter the task description as a text entry via a keyboard, for example. In examples, the task deadline is a deadline associated with completed the task. For example, the deadline may include a specific date by which the task is to be completed and/or a specific amount of time to complete the task (e.g., a number of days, weeks, months, etc.). In one example, when the task deadline parameter is set, the task object may automatically be entered as a calendar entry in the calendar of the collaborator who is assigned the task object. The task reminder is a reminder that the task is to be completed. For example, a task reminder of the task object may be set for an amount of time before the task deadline. In this regard, the collaborator assigned the task may receive a reminder that the task object is to be completed by the deadline. In one example, the reminder may be received via an email message. In another example, the reminder may be received via a notification. The task priority level is the priority level at which the task is to be completed. For example, the task priority level may include high, medium, and low. In this regard, the task priority level of the task object may be set to high, medium, or low.

In aspects, the user interface component 110, the file rendered on the user interface, and/or the email application may create a reference point within the file. The reference point may be associated with the task object. For example, the reference point may include the content and/or a portion of the content of the file associated with the task object. For example, if the task object includes an editing action, the reference point may be the portion of the file that is to be edited based on the task object. In some examples, the reference point within the file may be accessed via the email application by receiving an indication of interest made with respect to the task object. In one example, an indication of interest may include touching, clicking on, audibly referencing, pointing to, selecting, and/or any indication of an interest in or selection of the task object. In this regard, in response to receiving an indication of interest made with respect to the task object, the reference point within the file may be accessed by opening the portion of the file including the reference point. Using the example described above herein, when the task object includes an editing action, the file may be opened at the portion of the file to be edited in response to receiving an indication of interest made with respect to the task object.

In aspects, the user interface component 110, the file rendered on the user interface, and/or the email application may assign the task object to at least one collaborator of the file. In some examples, the task object may be assigned to a specific collaborator. In other examples, the task object may be assigned to any of the collaborators of the file. For example, the task object may be assigned such that any collaborator of the file can complete the task. In one example, the task object may be assigned to at least one collaborator of the file via the email application using at least one of an email message, a notification, and a task list. For example, when a collaborator is assigned a task, the task object may appear in an email inbox (e.g., in an email message) of the collaborator, as an item in a task list (e.g., a task to-do list) of the collaborator, and/or as a notification to the collaborator. In this regard, when the task object is assigned to the at least one collaborator of the file via the email application using an email message, the task object may be displayed in the reading pane of the email application. In another example, when the task object is assigned to the at least one collaborator of the file via the email application using a notification, the task object may be displayed in the notification. In yet another example, when the task object is assigned to the at least one collaborator of the file via the email application using a task list, the task object may be displayed as an item in the task list.

In one example, the user interface component 110 may be a touchable user interface that is capable of receiving input via contact with a screen of the client computing device 104, thereby functioning as both an input device and an output device. For example, content may be displayed, or output, on the screen of the client computing device 104 and input may be received by contacting the screen using a stylus or by direct physical contact of a user, e.g., touching the screen. Contact may include, for instance, tapping the screen, using gestures such as swiping or pinching the screen, sketching on the screen, etc.

In another example, the user interface component 110 may be a non-touch user interface. In one case, a tablet device, for example, may be utilized as a non-touch device when it is docked at a docking station (e.g., the tablet device may include a non-touch user interface). In another case, a desktop computer may include a non-touch user interface. In this example, the non-touchable user interface may be capable of receiving input via contact with a screen of the client computing device 104, thereby functioning as both an input device and an output device. For example, content may be displayed, or output, on the screen of the client computing device 104 and input may be received by contacting the screen using a cursor, for example. In this regard, contact may include, for example, placing a cursor on the non-touchable user interface using a device such as a mouse.

In some aspects, the server computing device 106 may include a storage platform 130 and the data store 140. In one example, the storage platform 130 may be configured to store, manage, and access data and/or information associated with the file collaboration system 100. For example, the storage platform 130 may store one or more files and/or one or more tasks/task objects associated with a file in a data store 140. In one example, data store 140 may be part of and/or located at the storage platform 130. In another example, data store 140 may be a separate component and/or may be located separate from the storage platform 130. It is appreciated that although one server computing device 106 is illustrated in FIG. 1, the file collaboration system 100 may include a plurality of server computing devices 106 with a plurality of storage platforms 130 and a plurality of data stores 140. In some cases, the server computing device 106 may include a plurality of storage platforms 130 and a plurality of data stores 140. For example, the plurality of storage platforms 130 may include at least file storage providers, external activity services and document editing clients. In one example, the storage platform 130 may be a cloud storage service such as OneDrive, SharePoint, Google Drive, Dropbox, and the like. In one example, the storage platform 130 may be an email service such as Microsoft Outlook®, Outlook Web App®, Mobile Outlook®, Hotmail®, Outlook.com, as well as any other email service.

Figure 2A:
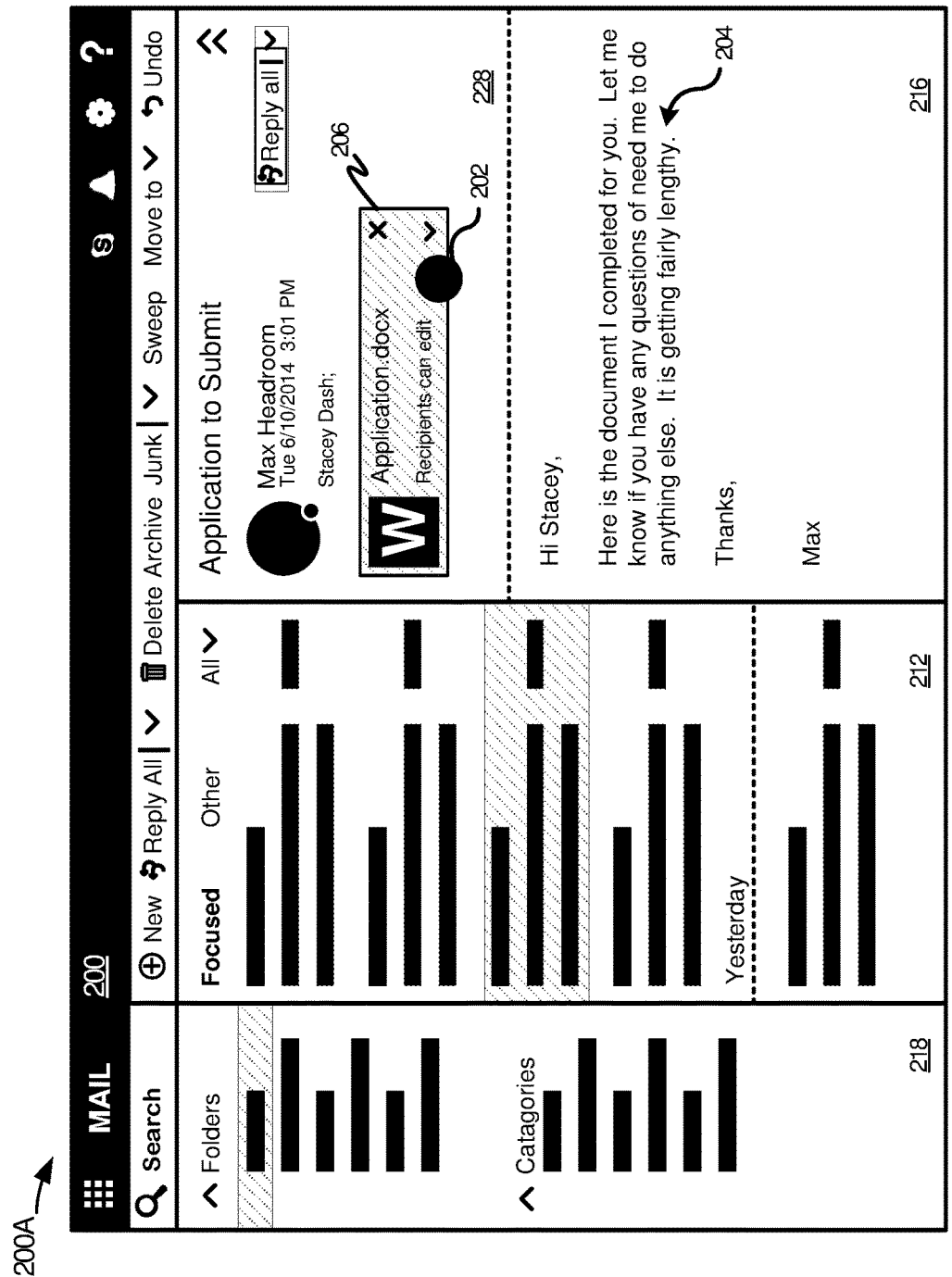
FIG. 2A illustrates one view in a progression of views an email application displayed on a user interface of a client computing device, according to an example aspect.

Referring now to FIG. 2A, one view 200A in a progression of views of an application 200 displayed on a user interface of the client computing device 104, such as a desktop computer, tablet computer or a mobile phone, for example, is shown. The exemplary application, as shown in FIG. 2A, is an email application. In one example, an application may include any application suitable for collaboration and/or co-authoring such as a word processing application, spreadsheet application, electronic slide presentation application, email application, chat application, voice application, and the like. In one case, a file associated with and/or created with the application may include a word document, a spreadsheet, an electronic slide presentation, an email, a chat conversation, and the like. As such, an exemplary application may be an email application, as illustrated in FIG. 2A. In this example, an exemplary file associated with the email application 200 may include an email.

In aspects, the view 200A of the email application 200 is one example view a user may encounter when interacting with the email application 200. As illustrated, the exemplary view 200A of the email application 200 displayed on the client computing device 104 includes a navigation pane 218, a message list 212, a reading pane 216, and a message header 228. The various components described herein may be implemented using hardware, software, or a combination of hardware and software. The navigation pane 218 includes contents and options for activating various modules, services, and/or applications that are part of the email application 200. For example, the navigation pane 218 may include options for activating mail, calendars, tasks, contacts, notes, folders, and the like. In one example, the navigation pane 218 may include a plurality of folders. In one case, when a folder in the navigation pane 218 is selected, a plurality of messages associated with the selected folder may be rendered and displayed within the message list 212 of the email application 200. In some cases, when a message is selected, contents 204 associated with the selected may be displayed in reading pane 216. In this regard, the reading pane 216 may include contents associated with a selected message from the plurality of messages in the message list 212. The message header 228 may include information associated a selected message from the plurality of messages in the message list 212. For example, the information associated with a selected message may include the date, time, subject, sender, receiver, and the like. In another example, the message header 228 may include a file as an attachment 206. In this regard, in response to receiving an indication of interest 202 within respect to the attachment 206, the file may be opened and displayed within the email application 200 (as illustrated below relative to FIG. 2B).

Figure 2B:
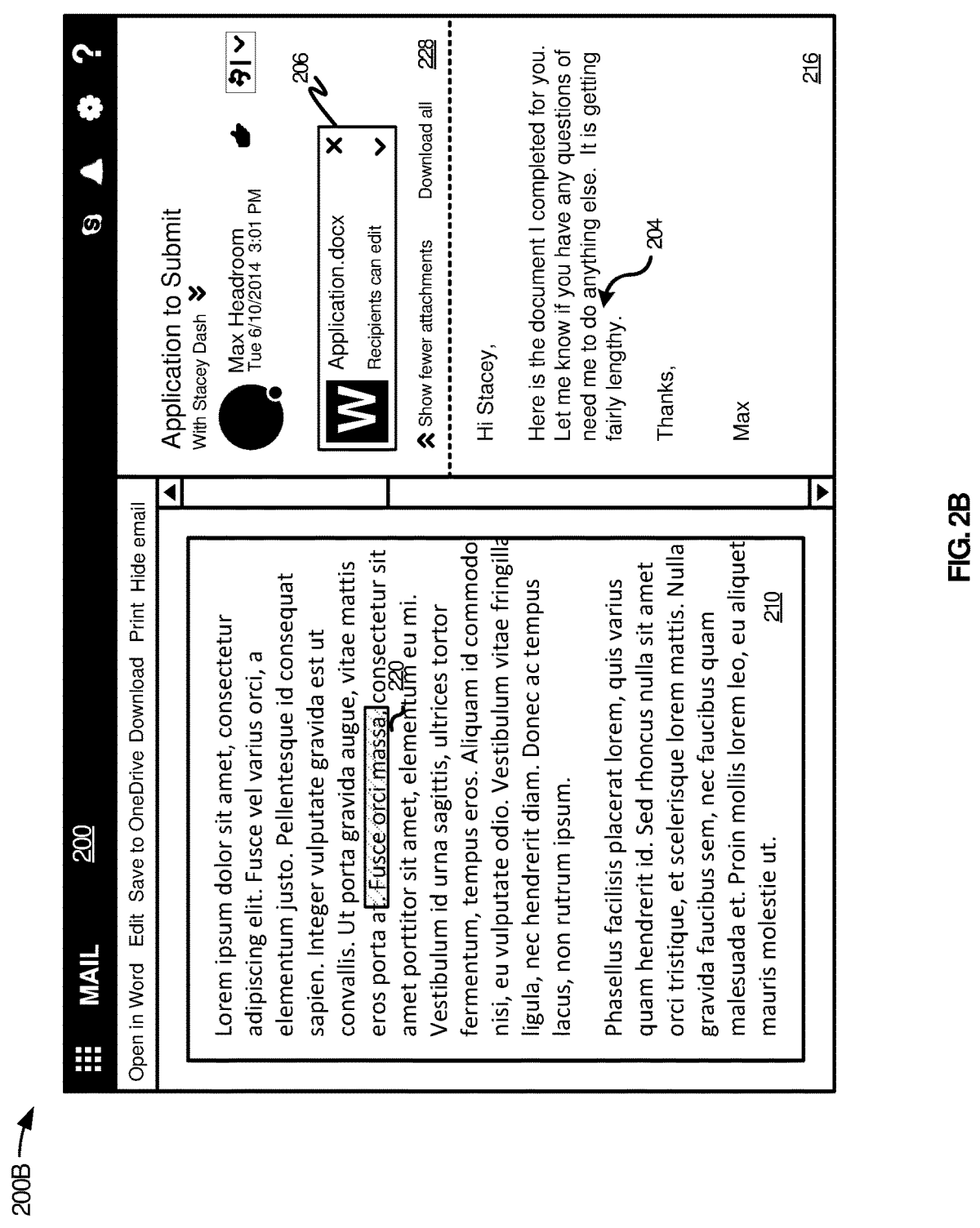

FIG. 2B illustrates another view 200B in a progression of views of the email application 200. The view 200B of the email application 200 is one example view a user may encounter when interacting with the email application 200. As illustrated, the exemplary view 200B of the email application 200 displayed on the client computing device 104 includes a file 210, the reading pane 216, and the message header 228. As illustrated, the content 204 associated with a selected message is displayed in reading pane 216. The message header 228 includes the attachment 206 and information associated with the selected message such as the date, time, subject, sender, receiver, and the like. As discussed above, a file may include a word document, a spreadsheet, an electronic slide presentation, an email, a chat conversation, and the like. In the example illustrated in FIG. 2B, the file 210 is a word document. As illustrated, the file 210 and the reading pane 216 are displayed side by side within the email application 200. In some examples, the file 210 and the reading pane 216 are displayed side by side within the email application 200 in response to receiving an indication of interest with respect to an attachment in the message header 228, as described above relative to FIG. 2A.

Figure 2C:
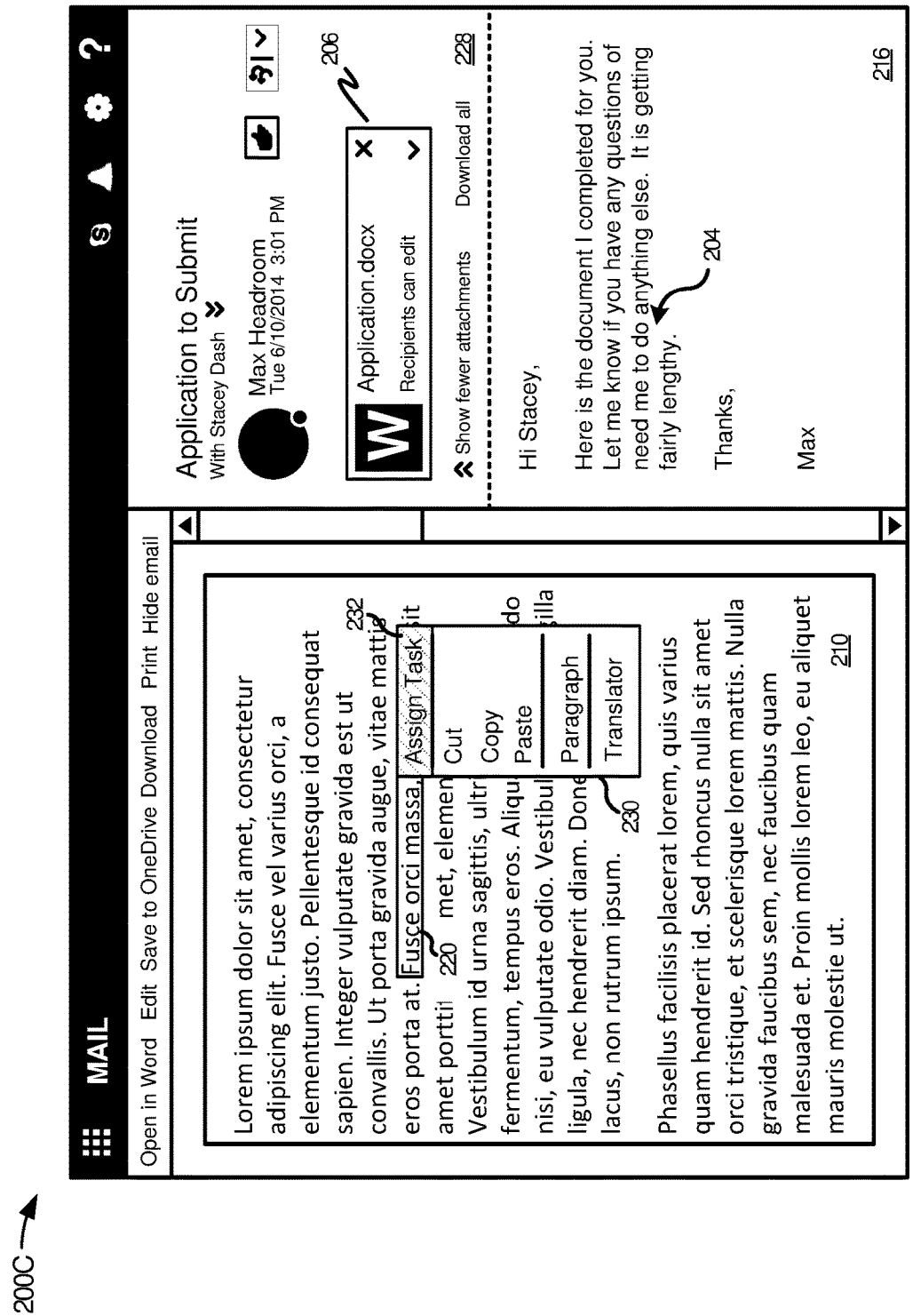
FIG. 2C illustrates another view in the progression of views of the email application of FIG. 2A, according to an example aspect.

The file 210 includes a highlighted portion of content 220. In one example, in response to detecting the highlighted portion of content 220 within the file 210, a contextual menu including at least one contextual action may be displayed within the file 210. With reference now to FIG. 2C, in one example, in response to an input made with respect to the file 210 (e.g., in response to detecting the highlighted portion of content 220 within the file 210), a contextual menu 230 associated with the file 210 may be displayed. FIG. 2C illustrates another view 200C in a progression of views of the email application 200. The view 200C of the email application 200 is one example view a user may encounter when interacting with the email application 200. As illustrated, the exemplary view 200C of the email application 200 displayed on the client computing device 104 includes the file 210, the reading pane 216, and the message header 228. As illustrated, the content 204 associated with a selected message is displayed in reading pane 216. The message header 228 includes the attachment 206 and information associated with the selected message such as the date, time, subject, sender, receiver, and the like. As illustrated, the file 210 and the reading pane 216 are displayed side by side within the email application 200. The file 210 includes the highlighted portion of content 220 and the contextual menu 230.

As illustrated in FIG. 2C, the contextual menu 230 includes at least one contextual action. In the example illustrated in FIG. 2C, the contextual menu 230 includes a plurality of contextual actions including assign task, cut, copy, paste, paragraph, and translator. In one example, in response to receiving a selection 232 of the at least at least one contextual action, a task object and a reference point may be created within the file 210. In some examples, the reference point is associated with the task object. As illustrated in FIG. 2C, the selected contextual action 232 is assign task. In this regard, in response to receiving a selection of the assign task contextual action, a task object and a reference point may be created within the file 210.

Figure 2D:
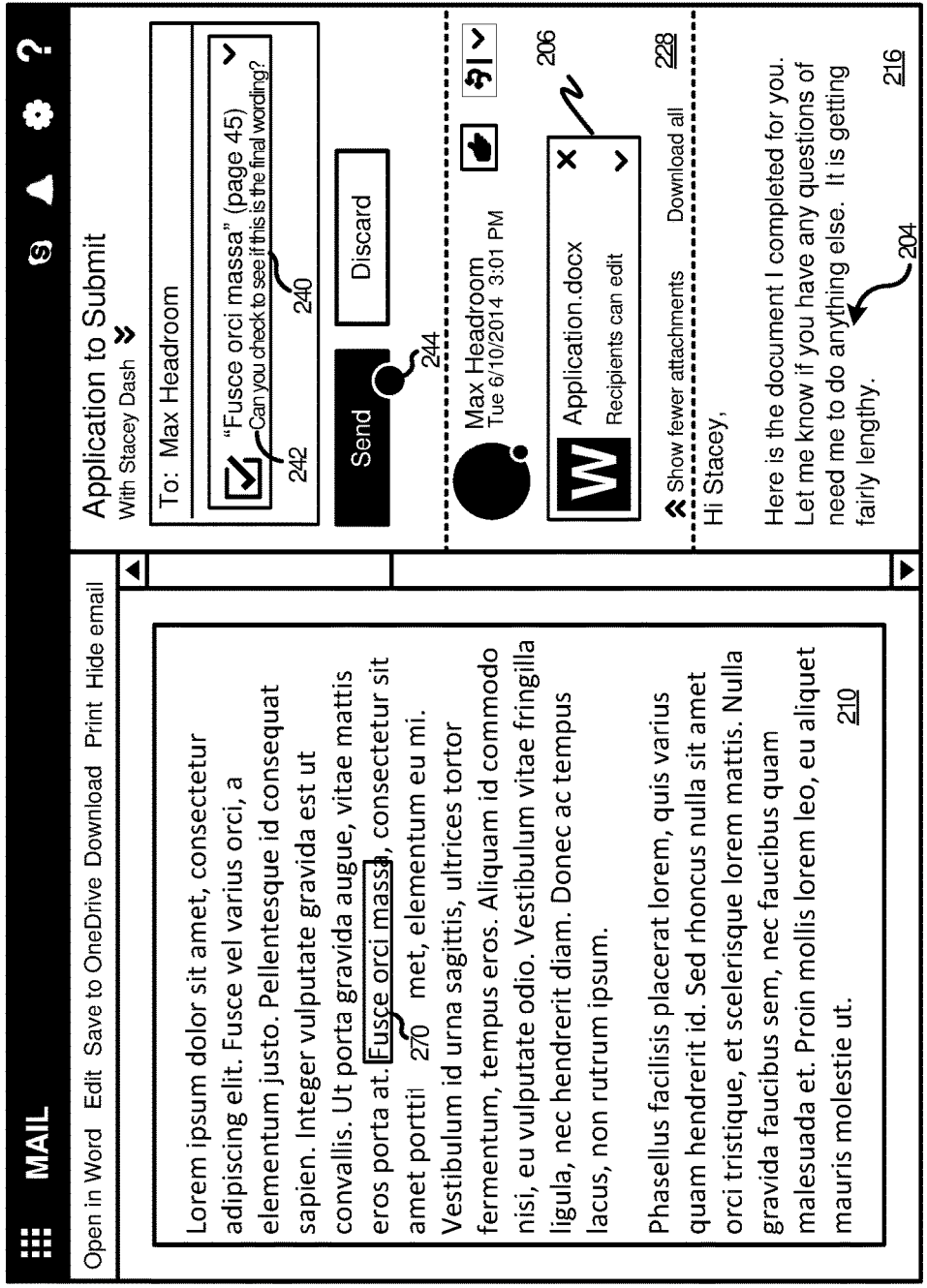
FIG. 2D illustrates another view in the progression of views of the email application of FIG. 2A, according to an example aspect.

With reference now to FIG. 2D, in one example, in response to receiving a selection of the assign task contextual action, a task object 240 and a reference point 270 may be created within the file 210. FIG. 2D illustrates another view 200D in a progression of views of the email application 200. The view 200D of the email application 200 is one example view a user may encounter when interacting with the email application 200. As illustrated, the exemplary view 200D of the email application 200 displayed on the client computing device 104 includes the file 210, the reading pane 216, and the message header 228. As illustrated, the content 204 associated with a selected message is displayed in reading pane 216. The message header 228 includes the attachment 206 and information associated with the selected message such as the date, time, subject, sender, receiver, and the like. As illustrated, the file 210 and the reading pane 216 are displayed side by side within the email application 200. The file 210 includes the reference point 270. The reference point 270 may be associated with the task object 240.

The reading pane 216 further includes the task object 240. As discussed above, the task object 240 is an action to be completed by a collaborator of the file 210. For example, the task object may include an action such as editing, reviewing, adding content, formatting, sharing, commenting, and the like. In the example illustrated in FIG. 2D, the task object action is an action/task to review and/or edit a portion of the file 210. In some examples, the task object 240 includes one or more parameters associated with the task object 240. As illustrated in FIG. 2D the task object 240 includes a task description 242. The task description 242 may describe the task and/or action to be completed. For example, the task description 242 is "Can you check to see if this is the final wording?" In one example, the collaborator creating the task may enter the task description 242 as a text entry via a keyboard, for example, as illustrated in FIG. 2D. In other examples, the task object may include one or more parameters such as a task deadline, a task reminder, and a task priority level (not illustrated).

As discussed above, the task object 240 may be assigned to a specific collaborator. In the example illustrated in FIG. 2D, the task object 240 is assigned to the collaborator Max Headroom. In the example illustrated in FIG. 2D, the task object 240 is assigned to Max Headroom via the email application 200 using an email message. In this regard, in response to receiving a selection 244 of an option to assign the task object 240 to a collaborator of the file 210 (e.g. Max Headroom) via the email application 200 using an email message, the task object 240 may be assigned to the collaborator of the file 210. In this example, an email message including the task object 240 may be sent to the collaborator of the file 210.

Figure 2E:
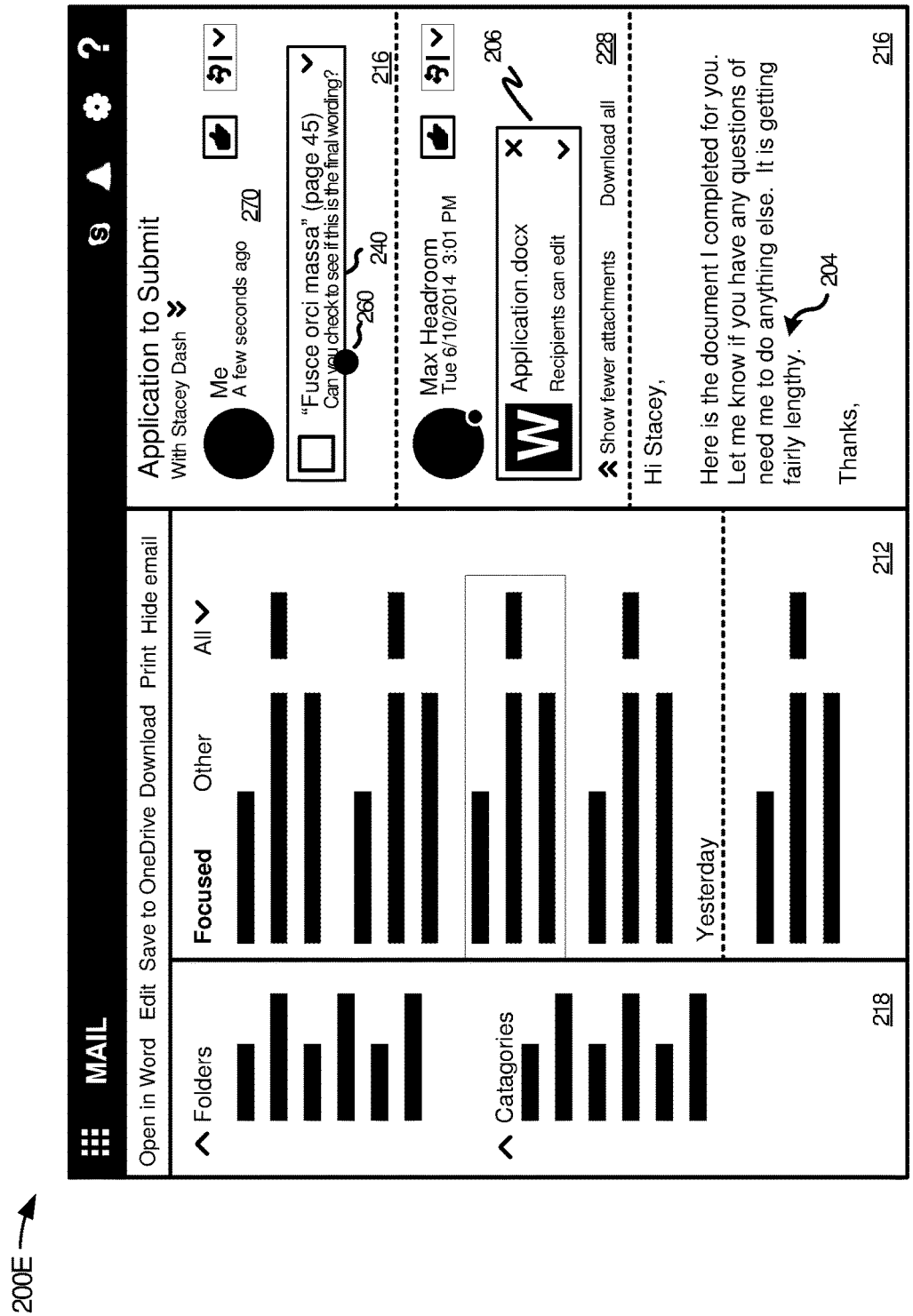
FIG. 2E illustrates another view in the progression of view of the email application of FIG. 2A, according to an example aspect.

FIG. 2E illustrates another view 200E in a progression of views of the email application 200. The view 200E of the email application 200 is one example view a user may encounter when interacting with the email application 200. As illustrated, the exemplary view 200E of the email application 200 displayed on the client computing device 104 includes the navigation pane 218, the message list 212, the reading pane 216, the message header 228, and additional message header 270, and the task object 240. The navigation pane 218 includes contents and options for activating various modules, services, and/or applications that are part of the email application 200. For example, the navigation pane 218 may include options for activating mail, calendars, tasks, contacts, notes, folders, and the like. In one example, the navigation pane 218 may include a plurality of folders. In one case, when a folder in the navigation pane 218 is selected, a plurality of messages associated with the selected folder may be rendered and displayed within the message list 212 of the email application 200. The content 204 associated with a selected message is displayed in reading pane 216. The message header 228 includes the attachment 206 and information associated with the selected message such as the date, time, subject, sender, receiver, and the like. The additional message header 270 includes information associated with the task object 240 such as the date, time, subject, sender, receiver, and the like.

In examples, the reading pane 216 further includes the task object 240. In this regard, as illustrated in FIG. 2E, when the task object 240 is assigned to the at least one collaborator of the file 210 via the email application 200 using an email message, the task object 240 is displayed in the reading pane 216 of the email application 200. In other examples, when a collaborator is assigned a task, the task object 240 may appear as an item in a task list (e.g., a task to-do list) of the collaborator and/or as a notification to the collaborator (not illustrated). In one example, the task object 240 may be assigned via one of an email message, a notification, and a task list such that the task object 240 appears in one of an email message, an item in a task list, and a notification. In other examples, the task object 240 may be assigned such via one of an email message, a notification, and a task list such that the task object 240 appears in each of an email message, an item in a task list, and a notification. In one example, when the task object 240 is assigned to the at least one collaborator of the file 210 via the email application 200 using a notification, the task object 240 may be displayed in the notification (not illustrated). In yet another example, when the task object 240 is assigned to the at least one collaborator of the file 210 via the email application 200 using a task list, the task object 240 may be displayed as an item in the task list (not illustrated).

Figure 2F:
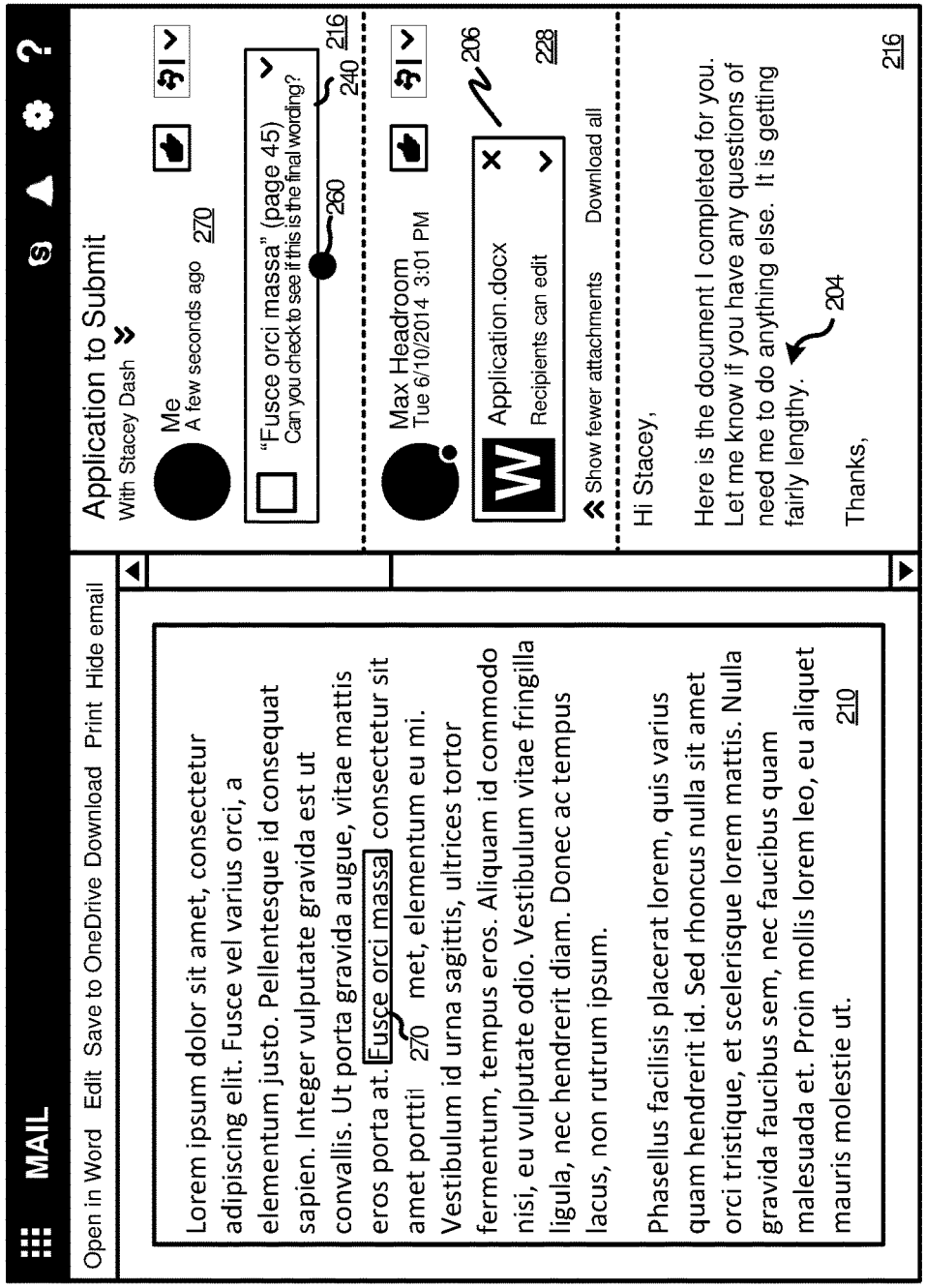
FIG. 2F illustrates another view in the progression of view of the email application of FIG. 2A, according to an example aspect.

In one example, in response to an indication of interest 260 made with respect to the task object 240 within the reading pane 216, a portion of the file 210 including the reference point 270 may be displayed. With reference now to FIG. 2F, in response to an indication of interest made with respect to the task object 240 within the reading pane 216, the reference point 270 within the file 210 may be accessed by opening the portion of the file 210 including the reference point 270, as illustrated. FIG. 2F illustrates another view 200F in a progression of views of the email application 200. The view 200F of the email application 200 is one example view a user may encounter when interacting with the email application 200. As illustrated, the exemplary view 200F of the email application 200 displayed on the client computing device 104 includes the file 210, the reading pane 216, the message header 228, and the additional message header 270. As illustrated, the content 204 associated with a selected message is displayed in reading pane 216. The message header 228 includes the attachment 206 and information associated with the selected message such as the date, time, subject, sender, receiver, and the like. The additional message header 270 includes information associated with the task object 240 such as the date, time, subject, sender, receiver, and the like. As illustrated, the file 210 and the reading pane 216 are displayed side by side within the email application 200.

As illustrated in FIG. 2F, the file 210 includes the reference point 270 and the reading pane 216 further includes the task object 240. As discussed above, the reference point 270 may be associated with the task object 240. For example, the reference point 270 may include the content and/or a portion of the content of the file 210 associated with the task object 240. In this regard, the reference point 270 is the portion of the file 210 that is to be reviewed and/or edited based on the task object 240 (e.g., as assigned relative to the illustration of FIG. 2D). In some examples, the task object 240 may include a task complete option (not illustrated). The task complete option may allow a collaborator to indicate to the collaborator who assigned the task that the task has been completed and should be dismissed and/or removed. In one example, in response to an indication of interest made with respect to the task complete option, the task object 240 is set to a complete status. In some cases, the complete status may be sent to the collaborator who assigned the task to notify the collaborator that the task/task object 240 has been completed. In one example, the complete status may be sent to the collaborator who assigned the task via a notification. In this regard, the task object 240 may be completed and/or dismissed quickly and efficiently from an email message (e.g., from within the reading pane 216).

Figure 3:
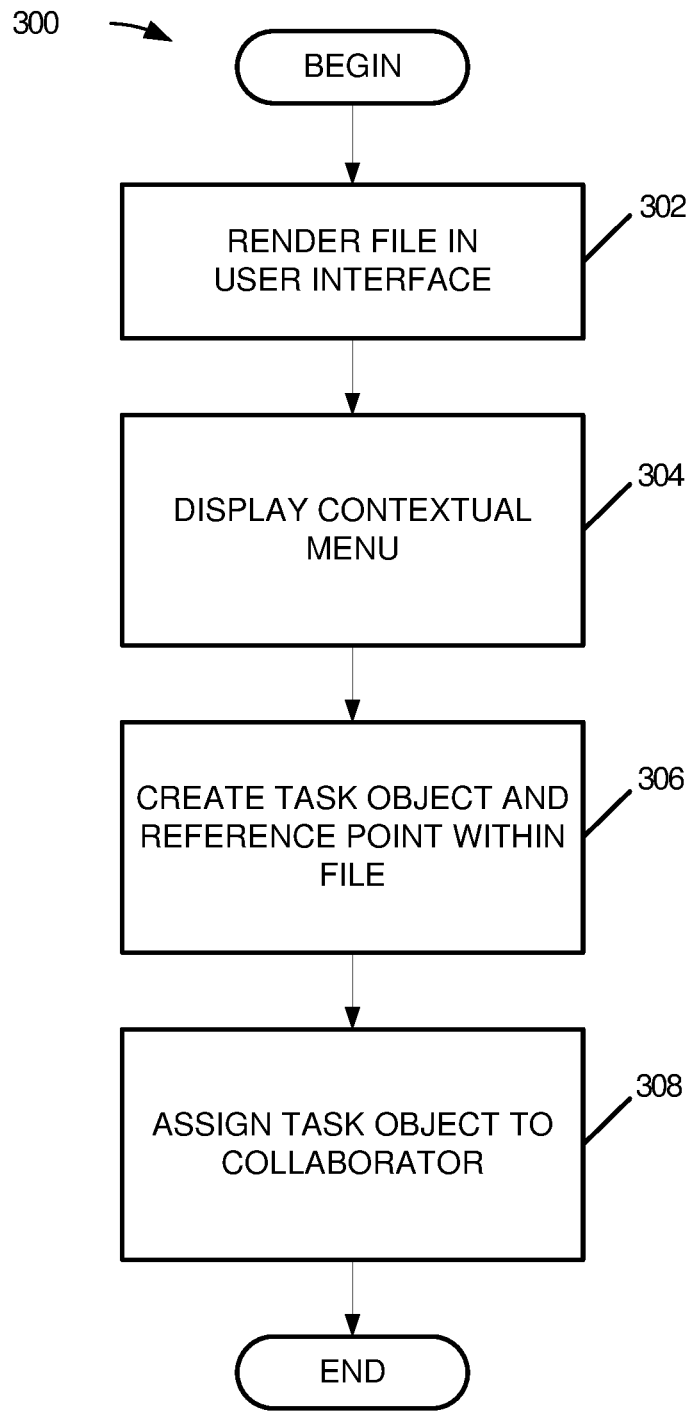
FIG. 3 illustrates an exemplary method for assigning a task associated with a file, according to an example aspect.

Referring now to FIG. 3, an exemplary method 300 for assigning a task associated with a file, according to an example aspect is shown. Method 300 may be implemented on a computing device or a similar electronic device capable of executing instructions through at least one processor. For example, the software application may be one of an email application, a social networking application, project management application, a collaboration application, an enterprise management application, a messaging application, a word processing application, a spreadsheet application, a database application, a presentation application, a contacts application, a calendaring application, etc. This list is exemplary only and should not be considered as limiting. Any suitable application for assigning tasks associated with a file through a contextual action may be utilized by method 300, including combinations of the above-listed applications.

Method 300 may begin at operation 302, where rendering of a file in a user interface is initiated. In one example, the file may be rendered on a client computing device. In one example, an application may include any application suitable for collaboration and/or co-authoring such as a word processing application, spreadsheet application, electronic slide presentation application, email application, chat application, voice application, and the like. In one case, a file associated with the application may include a word document, a spreadsheet, an electronic slide presentation, an email, a chat conversation, and the like. In one example, the file may be rendered within an email application including a reading pane. The file and the reading pane may be displayed side by side within the email application.

When the file is rendered in a user interface, flow proceeds to operation 304 where in response to an input made with respect to the file, a contextual menu associated with the file may be displayed. In one example, the contextual menu may include at least one contextual action. In one example, the input made with respect to the file includes highlighting content within the file. In another example, the input made with respect to the file includes receiving a selection of a contextual action within a contextual menu associated with the file. For example, a contextual menu associated with the file may include one or more contextual actions that may be performed in relation to the file. For example, the one or more contextual actions may include actions such as copy, paste, font, comment, etc. In one example, the contextual action includes an assign task action. In this example, the task object may be created in response to receiving a selection of the assign task action within the contextual menu. In other examples, the contextual action may include a create task action, task assignment action, or any other contextual action for creating and/or assigning a task and/or a task object associated with the file. In some examples, in response to detecting highlighting of content within the file, the contextual menu including at least one contextual action may be displayed within the file.

When a contextual menu associated with the file is displayed, flow proceeds to operation 306 where in response to receiving a selection of the at least one contextual action, a task object and a reference point are created within the file. The task object is an action to be completed by a collaborator of the file. The action may include any action and/or task associated with the file and/or the collaboration application associated with the file. For example, the task object may include an action such as editing, reviewing, adding content, formatting, sharing, commenting, and the like. In some examples, the task object includes one or more parameters associated with the task object. For example, the one or more parameters associated with the task object may include at least a task description, a task deadline, a task reminder, and a task priority level. In one example, the reference point is associated with the task object. For example, the reference point within the file may include the point within the file where the input is received to create the task object. In another example, the reference point may include the content and/or a portion of the content of the file associated with the task object. For example, if the task object includes a reviewing action, the reference point may be the portion of the file that is to be reviewed based on the task object.

When a task object and reference point are created within the file, flow proceeds to operation 308 where the task object is assigned to at least one collaborator of the file. In some examples, the task object may be assigned to at least one collaborator of the file via the email application. The task object may be assigned to another collaborator via the email application using at least one of an email message, a notification, and a task list. For example, when the other collaborator(s) is/are assigned a task, the task object may appear in the other collaborator(s) email inbox (e.g., in an email message), as an item in the other collaborators(s) task to-do list, and/or as a notification to other collaborator(s). In this regard, when the other collaborator(s) select(s) the task object from an email message, the task to-do list, and/or notification, the portion of the file including the reference point (e.g., the highlighted portion of the file) may be opened and displayed to the other collaborator(s). In turn, a user and/or collaborator of the file may quickly, intuitively, and efficiently assign a task to another collaborator, receive and identify a task to be completed, and easily complete the task while collaborating within applications.

The term rendering as used herein generally refers to the various capabilities employed in various computing architectures to assemble information that can then be used by other capabilities to generate an image or images. Within the context of method 300, for example, rendering a file, for example, generally refers to assembling the information or data used to generate an image or images that together result in the file including collaboration features. Animation or other dynamics may also be used to achieve certain effects.

However, it may be appreciated that other perspectives on rendering may be considered within the scope of the present disclosure. For example, rendering as used herein may also, in some scenarios, be considered to refer to the various capabilities employed by various computing architectures to generate an image or images from information assembled for that purpose. With respect to the method 300, rendering a file may refer to generating an image or images, from information assembled for that purpose, that together result in the file, which can then be displayed.

It may also be appreciated that rendering in some scenarios may refer to a combination of the aforementioned possibilities. For example, rendering in some scenarios may refer to both assembling the information used to generate an image or images for a file and then generating the image or images of the file. In addition, a wide variety of other steps, processes, and stages may occur within the context of presenting views of an application, all of which may be considered part of presenting a view. Thus, yet one other variation on method 300 includes, but is not limited to, presenting a file on a user interface, presenting a contextual menu, creating a task object and reference point, and assigning a task object.

Figure 4:
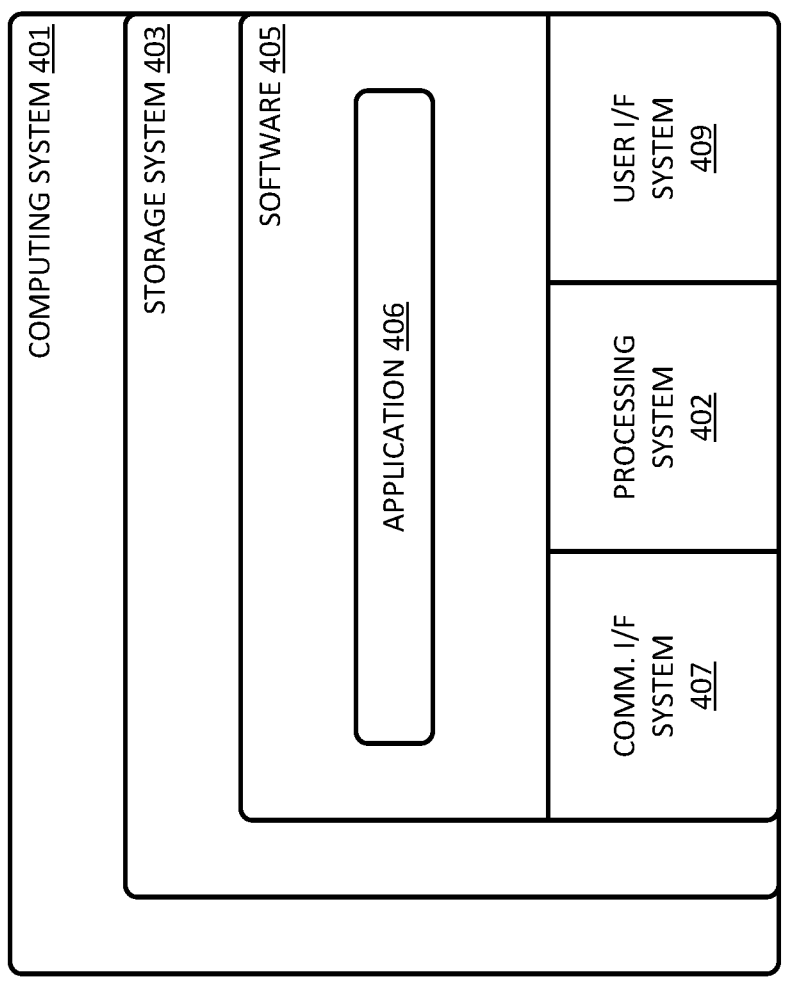
FIG. 4 illustrates a computing system suitable for implementing the enhanced collaboration/task assignment technology disclosed herein, including any of the environments, architectures, elements, processes, user interfaces, and operational scenarios and sequences illustrated in the Figures and discussed below in the Technical Disclosure.

FIG. 4 illustrates computing system 401 that is representative of any system or collection of systems in which the various applications, services, scenarios, and processes disclosed herein may be implemented. Examples of computing system 401 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 401 may be implemented as a single apparatus, system, or device or may be implemented in a distributed manner as multiple apparatuses, systems, or devices. Computing system 401 includes, but is not limited to, processing system 402, storage system 403, software 405, communication interface system 407, and user interface system 409. Processing system 402 is operatively coupled with storage system 403, communication interface system 407, and user interface system 409.

Processing system 402 loads and executes software 405 from storage system 403. Software 405 includes application 406, which is representative of the applications discussed with respect to the preceding FIGS. 1-3, including email applications described herein. When executed by processing system 402 to enhance collaboration, software 405 directs processing system 402 to operate as described herein for at least the various processes, operational scenarios, and sequences discussed in the foregoing implementations. Computing system 401 may optionally include additional devices, features, or functionality not discussed for purposes of brevity.

Referring still to FIG. 4, processing system 402 may comprise a micro-processor and other circuitry that retrieves and executes software 405 from storage system 403. Processing system 402 may be implemented within a single processing device, but may also be distributed across multiple processing devices or sub-systems that cooperate in executing program instructions. Examples of processing system 402 include general purpose central processing units, application specific processors, and logic devices, as well as any other type of processing device, combinations, or variations thereof.

Storage system 403 may comprise any computer readable storage media readable by processing system 402 and capable of storing software 405. Storage system 403 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device, but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions for implementing enhanced application collaboration/task assignment.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtual machine software, or other application software, in addition to or that include application 406. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized to facilitate enhanced application collaboration/task assignment. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 409 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 409. In some cases, the input and output devices may be combined in a single device, such as a display capable of displaying images and receiving touch gestures. The aforementioned user input and output devices are well known in the art and need not be discussed at length here.

User interface system 409 may also include associated user interface software executable by processing system 402 in support of the various user input and output devices discussed above. Separately or in conjunction with each other and other hardware and software elements, the user interface software and user interface devices may support a graphical user interface, a natural user interface, or any other type of user interface.

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Among other examples, the present disclosure presents systems comprising one or more computer readable storage media; and program instructions stored on the one or more computer readable storage media that, when executed by at least one processor, cause the at least one processor to at least: initiate rendering of a file within an email application including a reading pane; create a task object based on an input made with respect to the file; create a reference point within the file, the reference point associated with the task object; and assign the task object to at least one collaborator of the file via the email application. In further examples, the task object is assigned to the at least one collaborator of the file via the email application using at least one of an email message, a notification, and task list. In further examples, the file and the reading pane are displayed side by side within the email application. In further examples, the reference point within the file is accessed through the email application by receiving an indication of interest made with respect to the task object. In further examples, in response to receiving an indication of interest made with respect to the task object, the program instructions, when executed by the at least one processor, further cause the at least one processor to access the reference point within the file by opening a portion of the file including the reference point. In further examples, the input made with respect to the file includes highlighting content within the file. In further examples, the input made with respect to the file includes receiving a selection of a contextual action within a contextual menu associated with the file. In further examples, the task object includes one or more parameters associated with the task object. In further examples, the one or more parameters associated with the task object include at least a task description, a task deadline, a task reminder, and a task priority level.

Further aspects disclosed herein provide an exemplary computer-implemented method for a task associated with a file, the method comprising: initiating rendering of the file in a user interface; in response to an input made with respect to the file, displaying a contextual menu associated with the file, the contextual menu including at least one contextual action; in response to receiving a selection of the at least one contextual action, creating a task object and a reference point within the file, the reference point associated with the task object; and assigning the task object to at least one collaborator of the file. In further examples, the file is rendered in the user interface within an email application including a reading pane. In further examples, the task object is assigned to the at least one collaborator of the file via the email application using at least one of an email message, a notification, and task list. In further examples, when the task object is assigned to the at least one collaborator of the file via the email application using an email message, displaying the task object in the reading pane. In further examples, the computer-implemented method further comprises when the task object is assigned to the at least one collaborator of the file via the email application using a notification, displaying the task object in the notification. In further examples, the computer-implemented method further comprises when the task object is assigned to the at least one collaborator of the file via the email application using a task list, displaying the task object as an item in the task list. In further examples, the computer-implemented method further comprises accessing the reference point within the file through the email application in response to receiving an indication of interest made with respect to the task object.

Additional aspects disclosed herein provide exemplary computing apparatus comprising: one or more computer readable storage media; and an email application embodied at least in part in program instructions stored on the one or more computer readable storage media and comprising: a file in a user interface for collaborating among a plurality of collaborators of the file; a task object in a reading pane through which to receive an indication of interest made with respect to the task object; and a reference point within the file through which to, in response to the indication of interest made with respect to the task object, display a portion of the file including the reference point. In further examples, the task object includes a task complete option. In further examples, in response to an indication of interest made with respect to the task complete option, the task object is set to a complete status. In further examples, the task object comprises an action to be completed by a collaborator of the file.

Techniques for assigning tasks to collaborators of a file through a contextual action are described. Although aspects are described in language specific to structural features and/or methodological acts, it is to be understood that the aspects defined in the appended claims are not necessarily limited to the specific features or acts described above. Rather, the specific features and acts are disclosed as example forms of implementing the claimed aspects.

A number of methods may be implemented to perform the techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods may be implemented via interaction between various entities discussed above with reference to the touchable user interface.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Additionally, while the aspects may be described in the general context of collaboration systems that execute in conjunction with an application program that runs on an operating system on a computing device, those skilled in the art will recognize that aspects may also be implemented in combination with other program modules. In further aspects, the aspects disclosed herein may be implemented in hardware.

Generally, program modules include routines, programs, components, data structures, and other types of structures that perform particular tasks or implement particular abstract data types. Moreover, those skilled in the art will appreciate that aspects may be practiced with other computer system configurations, including hand-held devices, multiprocessor systems, microprocessor-based or programmable consumer electronics, minicomputers, mainframe computers, and comparable computing devices. Aspects may also be practiced in distributed computing environments where tasks are performed by remote processing devices that are linked through a communications network. In a distributed computing environment, program modules may be located in both local and remote memory storage devices.

Aspects may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or compact servers, an application executed on a single computing device, and comparable systems.

What is claimed is:

1. A system comprising:
one or more computer readable storage media; and
program instructions stored on the one or more computer readable storage media that, when executed by at least one processor, cause the at least one processor to at least:
initiate rendering of an email attachment within an email application including a reading pane comprising content of an email, the email attachment comprising a file created via a collaboration application that is distinguished from the email application; and
subsequent to opening the file in the email application:
in response to detecting a selection of at least a portion of content of the email attachment, enabling display of a contextual menu associated with the email attachment, the contextual menu including at least one contextual action;
in response to activating the at least one contextual action, create a task object including an action corresponding to the file;
create a reference point within the file, where access to the reference point is provided, via the email application, in response to receiving an indication of interest made with respect to the task object; and
assign, via the email application, the task object to at least one collaborator of the file.

2. The system of claim 1, wherein the task object is assigned to the at least one collaborator using at least one of an email message, a notification, and task list.

3. The system of claim 1, wherein the portion of content of the email attachment and the reading pane are displayed side by side within the email application.

4. The system of claim 1, wherein access to the reference point is provided via the email application by initiating rendering of at least a portion of the file in a user interface of the email application in response to receiving the indication of interest made with respect to the task object, wherein the portion of the file comprises the reference point.

5. The system of claim 1, wherein in response to receiving the indication of interest made with respect to the task object, the program instructions, when executed by the at least one processor, further cause the at least one processor to access the reference point by opening at least a portion of the file including the reference point.

6. The system of claim 1, wherein the program instructions, when executed by the at least one processor, further cause the at least one processor to display the task object in the reading pane when the task object is assigned to the at least one collaborator.

7. The system of claim 1, wherein the program instructions, when executed by the at least one processor, further cause the at least one processor to activate the at least one contextual action in response to a selection of the at least one contextual action.

8. The system of claim 1, wherein the task object includes one or more parameters associated with the task object.

9. The system of claim 8, wherein the one or more parameters associated with the task object include at least a task description, a task deadline, a task reminder, and a task priority level.

10. A computer-implemented method for assigning a task associated with an email attachment, the method comprising:
initiating rendering of the email attachment in a user interface of an email application, the email attachment comprising a file created via a collaboration application that is distinguished from the email application; and
subsequent to opening the file in the email application:
in response to detecting a selection of at least a portion of content of the email attachment, enabling display of a contextual menu associated with the email attachment, the contextual menu including at least one contextual action;
in response to activating the at least one contextual action, creating a task object including an action corresponding to the file and a reference point within the file, where access to the reference point is provided, via the email application, in response to receiving an indication of interest made with respect to the task object; and
assigning, via the email application the task object to at least one collaborator of the file.

11. The computer-implemented method of claim 10, wherein the file is rendered in the user interface within an email application including a reading pane.

12. The computer-implemented method of claim 11, wherein the task object is assigned to the at least one collaborator using at least one of an email message, a notification, and task list.

13. The computer-implemented method of claim 12, further comprising when the task object is assigned to the at least one collaborator using the email message, displaying the task object in the reading pane.

14. The computer-implemented method of claim 12, further comprising when the task object is assigned to the at least one collaborator using the notification, displaying the task object in the notification.

15. The computer-implemented method of claim 12, further comprising when the task object is assigned to the at least one collaborator of using the task list, displaying the task object as an item in the task list.

16. The computer-implemented method of claim 11, further comprising accessing the reference point the email application in response to receiving the indication of interest made with respect to the task object.

17. A computing apparatus comprising:
one or more computer readable storage media; and
an email application embodied at least in part in program instructions stored on the one or more computer readable storage media and comprising:
an email attachment displayed in a user interface for collaborating among a plurality of collaborators of the email attachment, the email attachment comprising a file created via a collaboration application that is distinguished from the email application;
a contextual menu displayed in response to detecting a selection of at least a portion of content of the email attachment, the contextual menu including at least one contextual action;
a task object, created subsequent to opening the file in the email application and in response to activating the at least one contextual action, assigned, via the email application, to at least one collaborator of the file; and
a reference point, created subsequent to opening the file in the email application, within the file at a location of the selection of at least the portion of content of the email attachment, where access to the reference point is provided, via the email application, in response to an indication of interest made with respect to the task object.

18. The computing apparatus of claim 17, wherein the task object includes a task complete option.

19. The computing apparatus of claim 18, wherein in response to an indication of interest made with respect to the task complete option, the task object is set to a complete status.

20. The computing apparatus of claim 17, wherein the task object comprises an action to be completed by a collaborator of the email attachment.

* * * * *

UNITED STATES PATENT AND TRADEMARK OFFICE
CERTIFICATE OF CORRECTION

PATENT NO. : 11,075,871 B2
APPLICATION NO. : 15/264803
DATED : July 27, 2021
INVENTOR(S) : Shahil Soni et al.

Page 1 of 1

It is certified that error appears in the above-identified patent and that said Letters Patent is hereby corrected as shown below:

On the Title Page

Item (54) and in the Specification, Column 1, Lines 1-2, the title should appear as follows:
TASK ASSIGNMENT FROM A FILE THROUGH A CONTEXUAL ACTION Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*